Patented Feb. 6, 1923.

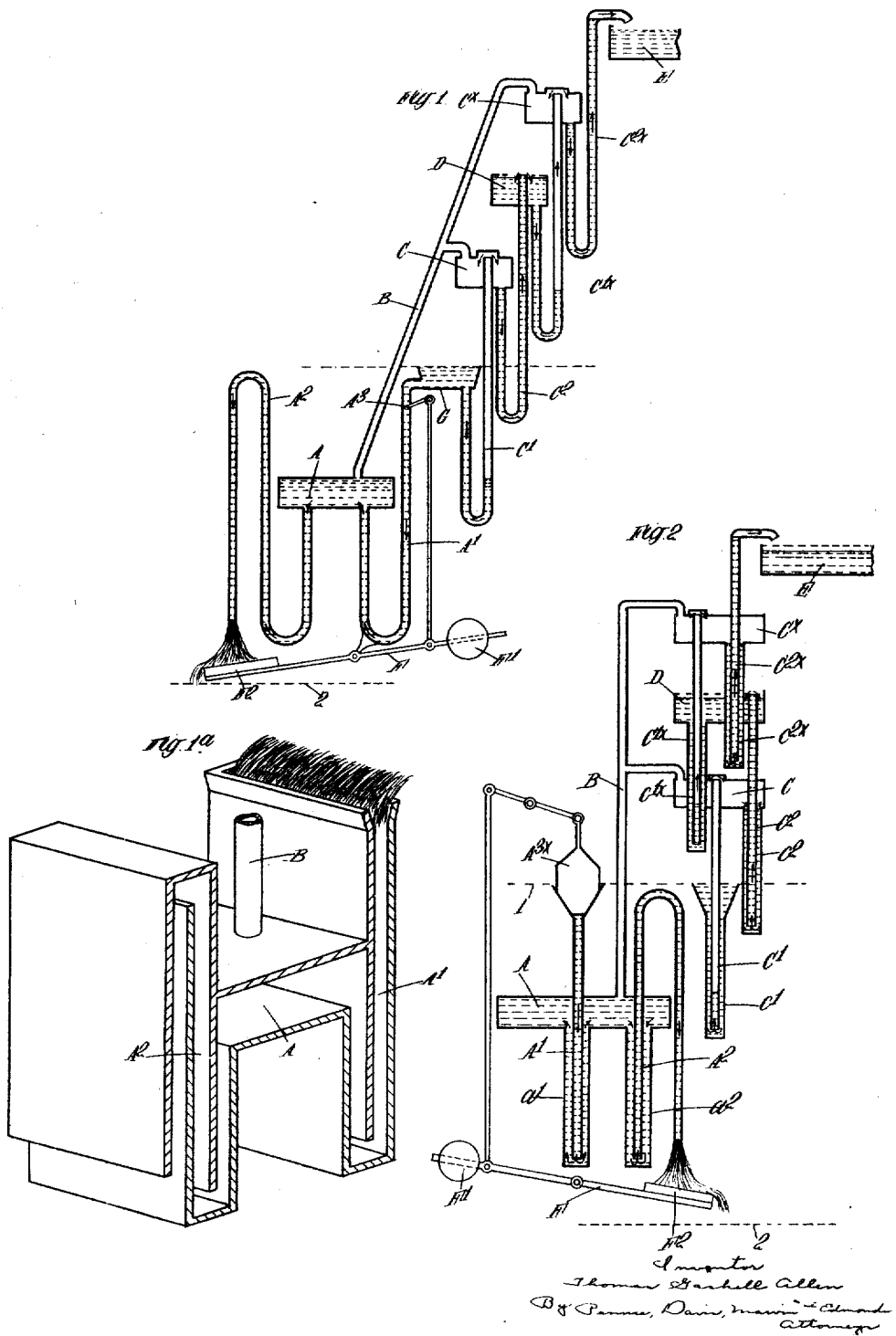

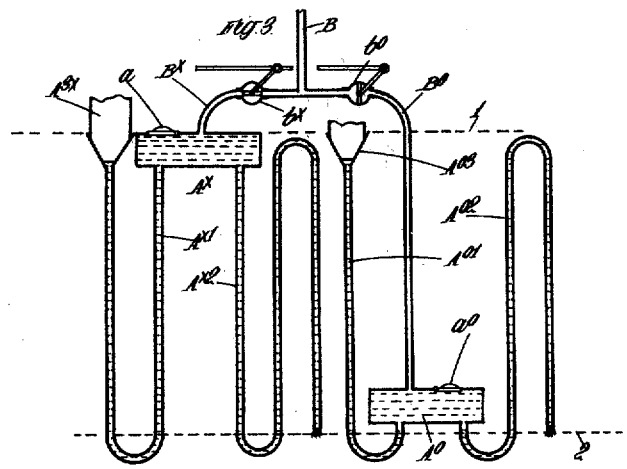

1,444,442

UNITED STATES PATENT OFFICE.

THOMAS GASKELL ALLEN, OF WESTMINSTER, LONDON, ENGLAND.

SYSTEM OF RAISING LIQUIDS.

Application filed October 5, 1921. Serial No. 505,519.

*To all whom it may concern:*

Be it known that I, THOMAS GASKELL ALLEN, a citizen of the Unitel States of America, residing at 106, Victoria Street, Westminster, in the county of London, England, have invented certain new and useful Improvements in or Relating to Systems of Raising Liquids of which the following is a specification.

This invention relates to a system of raising liquids and has for its chief object to devise means whereby water can be raised efficiently without the use of a mechanical pump or hydraulic ram from a river, canal or other body of water a portion of which is either naturally situated, or is artificially maintained, at a higher level than the rest, to a reservoir which is arranged at any suitable height and from which the water can be drawn, when required, for any desired purpose such as the supplying of a town with domestic water or the generation of electricity for power and lighting.

According to the invention I provide a tank or other closed chamber (hereinafter termed the operating chamber) which is alternately filled with water and emptied under the influence of static pressure resulting from the head of water due to the difference in water levels and which is connected by a conduit containing a column of air or other gaseous medium to a container arranged above the level of the liquid to be raised, the said container having a downwardly extending conduit communicating with the said liquid (which liquid will be hereinafter described as the high level water but which may be any other liquid) and also having an upwardly extending conduit communicating either directly or indirectly with the reservoir. The arrangement is such that when the operating chamber is being emptied (the inlet thereto being at this time closed) a suction is created in the air conduit to cause part of the high level water to be drawn into the container and when the operating chamber is being filled (the outlet therefrom being at this time closed) a pressure is created in the air conduit to force the water from the container either directly or indirectly into the reservoir, the container having water seals or traps or suitable flap or other non-return valves which permit this cycle of operations to take place. With a single container the maximum quantity of water (proportionate to the size of the operating chamber and the container) can be raised at each cycle of operations to a relatively small height according to the effective head of water; but in order to raise a smaller quantity of water, during each cycle, to a greater height I provide a number of containers arranged at successively increasing heights above the high level water with an intermediate open vessel interposed between and connected by conduits to each pair of containers. The vertical distances extising between each pair of the containers are preferably equal and the intermediate open vessels are preferably situated midway between the containers.

In a modified system which is particularly intended for raising dormant water (e. g. the water of a lake or reservoir in which there is no high level and low level water as aforesaid) the aforesaid operating chamber is replaced by a mechanical pumping device serving to create alternate pressure and suction in the aforesaid air conduit connected to the container or containers.

In order that the said invention may be clearly understood and readily carried into effect the same will now be described more fully with reference to the accompanying drawings in which:—

Figure 1 is a view showing diagrammatically a form of my invention, and

Figure 1ª is a view of a constructional form of the operating chamber and its associated parts.

Figure 2 is a view similar to Figure 1 showing a slightly modified form of the invention.

Figure 3 is a diagrammatic view showing a modified arrangement in which two operating chambers are used.

Referring first more particularly to Figure 1 the line 1 represents the surface of the high level water which is to be raised and the line 2 represents the surface of the low level water. A represents the aforesaid operating chamber which is situated at a suitable point between the surfaces of the high and low level water and which communicates by means of a U shaped pipe A' with the high level water and which is provided with a double U shaped outlet syphon pipe $A^2$, and B represents the aforesaid air pipe leading from the upper part of the chamber A. C, $C^x$ represent two of the aforesaid containers connected to the air pipe B, D represents the aforesaid intermediate open vessel and E represents the aforesaid reservoir to which the high level water is to be raised. In the example shown by Figure 1 the lower container communicates with a trough G (supplied from the high level water) and with the intermediate vessel D by U shaped pipes C', C² and the upper container communicates with the intermediate vessel D and the reservoir E by U shaped pipes C'$^x$ and C²$^x$. The upper ends of the pipes C', C², C'$^x$ and C²$^x$ communicate with the container C, the vessel D, the container C$^x$ and the reservoir E respectively at points above the level occupied by the water therein during pumping operations and these pipes together with the pipes A' and A² are constructed to form water seals or traps of a depth exceeding the head of water that effects the forcing and suction operations so that the necessity for using non-return valves is avoided. In the arrangement shown this head of water is the same for both forcing and suction owing to the fact that the vertical distance of the surface of the high level water 1 from the upper surface of the operating chamber A is the same as that of the outlet of the pipe A² from the lower surface of this chamber. In cases however where these distances are not equal, the water seals or traps must have a depth to suit the different water columns which effect the different forcing and suction operations; for example, the suction force being always limited to the pressure of the atmosphere which is approximately represented by a water column 33 ft high, the suction operation will always be restricted to this height whereas the forcing operation is unlimited. In such a case the water seals or traps on the suction side of the containers must be made to resist the back pressure under the forcing operation, whilst those on the pressure or forcing side of the containers need only be long enough to resist the smaller suction force.

In the example shown the pipe A' has a valve or cock A³ suitably connected to a lever F one arm of which has a weight F' and the other arm has a platform F² on to which the water from the pipe A² flows and so rocks the lever F into the position shown to close the valve A³. When the water ceases to flow from the pipe A² the weight F' moves the lever F into a position to open the valve A³. The emptying and filling of the chamber A thus takes place automatically. Instead of the said platform a perforated bucket may be used.

The most convenient way to prepare the system for automatic working is to fill with water all the closed containers and intermediate open vessels between the operating chamber and the reservoir, together with all the trapped connecting pipes. This can be done through the open pipes C² and C²$^x$, the air from the closed containers being thus forced out through the conduit B and the (as yet) unsealed outlet A² of the operating chamber. When the forcing operation is then allowed to take place the surplus water forced into the already filled open vessel D will overflow and run away. At the end of this first forcing operation the position will be as shown in Figure 1 that is to say the intermediate vessel D is full of water, the water in the pipes C', C², C'$^x$ and C²$^x$ is in the position shown and the suction operation is just commencing. The head of water in the outlet portion of the pipe A² below the chamber A creates a suction in the air pipe B (the valve A³ being at this time closed) and as the water flows out of the chamber A water is drawn into the container C from the high level water and into the container C$^x$ from the intermediate vessel D. When the flow from the pipe A² has ceased, with the emptying of the chamber A, the weight F' moves the lever F to open the valve A³ and water then enters the chamber through the pipe A' and pressure is thus exerted upon the water in the containers C and C$^x$ through the air in the air pipe B. The water is thus forced from the container C into the intermediate vessel D and from the container C$^x$ into the reservoir E. During succeeding emptyings and fillings of the operating chamber the above described operations are repeated and it will therefore be seen that a mass of water is thereby raised to the reservoir in a number of stages. The water in the U shaped pipes A', A², C', C², C'$^x$ and C²$^x$ forms water seals or traps during the forcing and suction operations.

In the arrangement illustrated by Figure 1$^a$ the operating chamber A and the water conduits A', A² are provided by two members built or formed to the shape shown and connected together in any suitable manner. The air pipe B is connected to one of these members as shown. In this case the valve A³ would be replaced by a sluice gate as described with reference to Figure 2.

The arrangement shown in Figure 2 is generally similar to that of Figure 1 except that the form of the water seals or traps is different, these being provided in Figure 2 by tubular chambers a', a², c', c², c'$^x$ and c²$^x$ in which the pipes A', A², C', C², C$^x$ and C²$^x$ are disposed with their lower ends near the bottom of these tubular chambers as is well understood. In this arrangement also the valve A³ in the pipe A' is replaced by a sluice gate shown diagrammatically at A³$^x$.

The volume of the aforesaid operating chamber should be preferably equal to the total volume of the several containers and the volume of each intermediate open vessel should be preferably equal to that of each container. The said operating chamber as shown is so arranged that the heads of water producing the forcing and suction operations are equal, but where the suction force, in order to equal the pressure force, would have to exceed the atmospheric pressure, the operating chamber is suitably arranged in a position nearer the low level water, so that the suction force is reduced and the pressure force correspondingly increased. The vertical distance between each container and the intermediate open vessel immediately above and below it is determined by the working head of water above and below the operating chamber, whatever it may happen to be. For instance, the clear distance between any container and the next intermediate open vessel above it should be not more than the net vertical height of the water column in the inlet pipe A' leading from the high level water to the top of the operating chamber, less the combined depths of the container and the intermediate open vessel to be filled. Likewise the clear vertical distance between any container and the lower intermediate open vessel should not be greater than the net vertical height of water in the outlet pipe $A^2$ from the bottom of the operating chamber, less the combined depth of the intermediate open vessel and the container into which the water is to be drawn. The reason is that only the minimum working water head is available when the operating chamber is filled with water at the finish of the forcing operation, just when it is called upon to sustain the maximum water head measuring from the bottom of the container to the top of the intermediate open vessel above. Likewise only the minimum working water column is available when the operating chamber is empty at the close of the suction operation, just when it is called upon to hold the maximum water column measured from the top of the container to the bottom of the intermediate open vessel below.

It is to be understood that a pair of operating chambers interconnected with the said air pipe may be used, one chamber being situated near the surface of the high level water and the other near the surface of the low level water. An arrangement of this character is shown in Figure 3 in which $A^x$ represents the upper operating chamber having an air pipe $B^x$, a U shaped water inlet pipe $A^{x\prime}$ and a double U shaped outlet syphon pipe $A^{x2}$ forming water seals, and $A^o$ represents the lower operating chamber having similar pipes $B^o$, $A^{o1}$ and $A^{o2}$. The air pipes $B^x$ and $B^o$ communicate with the air pipe B of Figure 1 or Figure 2 and are provided with valves $B^x$, $b^o$ so interconnected that one is closed while the other is open so that either the pipe $B^x$ or the pipe $B^o$ can be placed in communication with the pipe B as required. The said valves are preferably operated automatically by means of the lever F shown in Figures 1 and 2 which lever operates the sluice gates $A^{x3}$ and $A^{o3}$. The chambers $A^x$ and $A^o$ require non-return valves $a^x$, $a^o$ for the exit of air from the former chamber during the filling of this chamber with water and the entry of air into the other chamber during the emptying of this chamber, the valve $a^x$ opening outwardly and the valve $a^o$ opening inwardly. In this case the chamber $A^x$ is employed for the suction operation only and utilizes for this purpose the maximum head of water available and the other chamber $A^o$ is employed for the forcing operation only and likewise utlizes the maximum head of water for this purpose. This arrangement permits the series of containers to be spaced approximately twice the distance apart and the water is therefore raised aproximately twice the height as compared with the arrangement prevously described, but, of course, with a corresponding double waste of water. Figure 3, like Figures 1 and 2, shows the condition of affairs after a forcing operation has been completed and a suction operation is just commencing.

It is to be understood that although I have shown and described the liquid that is raised to the reservoir E as being part of the water that provides the static pressure for operating the system, the said liquid may be quite independent of the said water and may also be at a different level from that of the high level water; for example the said liquid might be at the bottom of a well or pit and consequently below the level of the water that operates the system.

What I claim and desire to secure by Letters Patent of the United States is:—

1. A system of raising liquids by means of static pressure obtained from a river, canal or other body of water a portion of which is situated at a higher level than the rest, comprising an operating chamber, means for alternately filling said chamber with water and emptying it under the influence of static pressure resulting from the head of water due to the difference in water levels, a container arranged above the level of the liquid to be raised, a conduit containing a gaseous medium and connecting said operating chamber with said container, a downwardly extending conduit which leads from said container to the liquid to be raised and through which this liquid is lifted into said container by the suction created by the emptying of said operating chamber and a conduit conveying liquid from said container during the filling of said operating chamber.

2. A system of raising liquids by means of static pressure obtained from a river, canal or other body of water a portion of which is situated at a higher level than the rest, comprising an operating chamber, means for alternately filling said chamber with water and emptying it under the influence of static pressure resulting from the head of water due to the difference in water levels, a container arranged above the level of the liquid to be raised, an air conduit connecting said operating chamber with said container, a downwardly extending conduit which leads from said container to the liquid to be raised and through which this liquid is lifted into said container by the suction created by the emptying of said operating chamber, a reservoir and a conduit conveying liquid from said container to said reservoir during the filling of said operating chamber.

3. A system of raising liquids by means of static pressure obtained from a river, canal or other body of water a portion of which is situated at a higher level than the rest, comprising an operating chamber, means for alternately filling said chamber with water and emptying it under the influence of static pressure resulting from the head of water due to the difference in water levels, two containers arranged at different heights above the level of the liquid to be raised, an air conduit connecting said operating chamber with each of said containers, an intermediate open vessel situated between said containers, an upwardly extending conduit connecting said vessel with the container above it, a downwardly extending conduit connecting said vessel with the container below it, a downwardly extending conduit which leads from the lower container to the liquid to be raised and through which and through the first mentioned downwardly extending conduit liquid is lifted by the suction created by the emptying of said operating chamber, a reservoir and a conduit conveying liquid from the upper container to said reservoir.

4. A system of raising liquids by means of static pressure obtained from a river, canal or other body of water a portion of which is situated at a higher level than the rest, comprising an operating chamber, means for alternately filling said chamber with water and emptying it under the influence of static pressure resulting from the head of water due to the difference in water levels, a plurality of containers arranged at successively increased heights above the level of the liquid to be raised, an air conduit connecting said operating chamber with each of said containers, an intermediate open vessel situated between each container and the one next above it, upwardly and downwardly extending conduits connecting each of said vessels with the containers next below and next above it, a downwardly extending conduit which leads from the lowermost container to the liquid to be raised and through which and through the other downwardly extending conduits liquid is lifted by the suction created by the emptying of said operating chamber, a reservoir and a conduit conveying liquid from the uppermost container to said reservoir.

5. A system of raising water from a river, canal or other body of water a portion of which is situated at a higher level than the rest, comprising an operating chamber, means for alternately filling said chamber with water and emptying it under the influence of static pressure resulting from the head of water due to the difference in water levels, a container arranged above the high level water, an air conduit connecting said operating chamber with said container, a downwardly-extending conduit which leads from said container to the high level water and through which the water is lifted into said container by the suction created by the emptying of said operating chamber and a conduit conveying water from said container during the filling of said operating chamber.

6. A system of raising water from a river, canal or other body of water a portion of which is situated at a higher level than the rest, comprising an operating chamber, means for alternately filling said chamber with water and emptying it under the influence of static pressure resulting from the head of water due to the difference in water levels, a container arranged above the high level water, an air conduit connecting said operating chamber with said container, a conduit which leads from said container to the high level water and through which the water passes to said container during the emptying of said operating chamber, a conduit conveying water from said container during the filling of said operating chamber and means whereby said water conduits form water seals or traps.

7. A system of raising liquids by means of static pressure obtained from a river, canal or other body of water a portion of which is situated at a higher level than the rest, comprising an operating chamber, means for alternately filling said chamber with water and emptying it under the influence of static pressure resulting from the head of water due to the difference in water levels, a container arranged above the level of the liquid to be raised, an air conduit connecting said operating chamber with said container, a downwardly extending conduit which leads from said container to the liquid to be raised and through which this liquid is lifted into said container by the suction created by the emptying of said operating chamber and a conduit conveying liquid from said container during the filling of said operating chamber said liquid conduits forming liquid seals or traps.

8. A system of raising liquids by means of static pressure obtained from a river, canal or other body of water a portion of which is situated at a higher level than the rest, comprising an operating chamber; an inlet conduit leading from said chamber to the high level water, a syphon outlet conduit conveying water from said chamber, a container arranged above the level of the liquid to be raised, an air conduit connecting said operating chamber with said container, a downwardly extending conduit which leads from said container to the liquid to be raised and through which this liquid is lifted into said container by the suction created by the emptying of said operating chamber and a conduit conveying liquid from said container during the filling of said operating chamber.

9. A system of raising liquids by means of static pressure obtained from a river, canal or other body of water a portion of which is situated at a higher level than the rest, comprising an operating chamber, an inlet conduit leading from said chamber to the high level water, a syphon outlet conduit conveying water from said chamber, a container arranged above the level of the liquid to be raised, an air conduit connecting said operating chamber with said container, a downwardly extending conduit which leads from said container to the liquid to be raised and through which this liquid is lifted into said container by the suction created by the emptying of said operating chamber, a conduit conveying liquid from said container during the filling of said operating chamber, and means whereby each of said liquid conduits forms a liquid seal or trap.

10. A system of raising liquids by means of static pressure obtained from a river, canal or other body of water a portion of which is situated at a higher level than the rest, comprising an operating chamber, an inlet conduit leading from said chamber to the high level water, a syphon outlet conduit conveying water from said chamber, a valve device controlling said inlet conduit, means for automatically closing said device when said chamber commences to empty and for automatically opening said device when the flow from said chamber ceases, a container arranged above the level of the liquid to be raised, an air conduit connecting said operating chamber with said container, a conduit which leads from said container to the liquid to be raised and through which this liquid passes to said container during the emptying of said operating chamber and a conduit conveying liquid from said container during the filling of said operating chamber.

11. A system of raising liquids by means of static pressure obtained from a river, canal or other body of water a portion of which is situated at a higher level than the rest, comprising an operating chamber, an inlet conduit leading from said chamber to the high level water, a syphon outlet conduit conveying water from said chamber, a valve device controlling said inlet conduit, a weighted member operated by the flow of water from said outlet conduit, means for connecting said member to said device so that the latter closes when the flow commences and opens when the flow ceases, a container arranged above the level of the liquid to be raised, an air conduit connecting said operating chamber with said container, a conduit which leads from said container to the liquid to be raised and through which this liquid passes to said container during the emptying of said operating chamber and a conduit conveying liquid from said container during the filling of said operating chamber.

12. A system of raising liquids by means of static pressure obtained from a river, canal or other body of water a portion of which is situated at a higher level than the rest, comprising an operating chamber situated between the levels of the high level water and the low level water, means for alternately filling said chamber with water and emptying it under the influence of static pressure resulting from the head of water due to the difference in water levels, a container arranged above the level of the liquid to be raised, at a height corresponding substantially to the vertical distance between the operating chamber and the low level water, an air conduit connecting said operating chamber with said container, a downwardly extending conduit which leads from said container to the liquid to be raised and through which this liquid is lifted into said container by the suction created by the emptying of said operating chamber and a conduit conveying liquid from said container during the filling of said operating chamber.

13. A system of raising liquids by means of static pressure obtained from a river, canal or other body of water a portion of which is situated at a higher level than the rest, comprising two operating chambers one arranged near the surface of the high level water and the other near the surface of the low level water, means for filling the lower chamber with water under the influence of static pressure resulting from the position of this chamber below the surface of the high level water, means for allowing this chamber to empty after it has been filled, means for allowing water to flow into the upper chamber, means for emptying the latter chamber under the influence of static pressure resulting from the position of this chamber above the low level water, a container arranged above the level of the liquid to be raised, an air conduit connecting said operating chambers with said container, a downwardly extending conduit which leads from said container to the liquid to be raised and through which this liquid is lifted into said container by the suction created by the emptying of said upper operating chamber and a conduit conveying liquid from said container during the filling of said lower operating chamber.

14. A system of raising liquids by means of static pressure obtained from a river, canal or other body of water a portion of which is situated at a higher level than the rest, comprising two operating chambers one arranged near the surface of the high level water and the other near the surface of the low level water, means for filling the lower chamber with water under the influence of static pressure resulting from the position of this chamber below the surface of the high level water, means for allowing this chamber to empty after it has been filled, means for allowing water to flow into the upper chamber, means for emptying the latter chamber under the influence of static pressure resulting from the position of this chamber above the low level water, an air conduit leading from the upper part of the lower operating chamber, a valve controlling this conduit, an air conduit leading from the upper part of the upper operating chamber, a valve controlling the latter conduit, a third air conduit with which the other air conduits communicate, a container arranged above the level of the liquid to be raised this container communicating with said third air conduit, a downwardly extending conduit which leads from said container to the liquid to be raised and through which this liquid is lifted into said container by the suction created by the emptying of said upper operating chamber, a conduit conveying liquid from said container during the filling of said lower operating chamber, means for automatically opening the first mentioned valve when the lower operating chamber commences to fill and for closing this valve when the upper chamber commences to empty, and means for automatically opening the second mentioned valve when the upper operating chamber commences to empty and for closing the latter valve when the lower operating chamber commences to fill.

THOMAS GASKELL ALLEN.